United States Patent [19]

Drawert et al.

[11] Patent Number: 5,162,490
[45] Date of Patent: Nov. 10, 1992

[54] POLYAMIDE RESINS BASED ON DIMERIZED FATTY ACIDS, PROCESS FOR PRODUCING THEM, AND PROCESS FOR MANUFACTURING PRINTING INKS BY THE USE OF SAID POLYAMIDE RESINS

[75] Inventors: Manfred Drawert, Fröndenberg; Horst Krase, Hamm, both of Fed. Rep. of Germany

[73] Assignee: Schering AG, Bergkamen, Fed. Rep. of Germany

[21] Appl. No.: 532,321

[22] Filed: Jun. 1, 1990

[30] Foreign Application Priority Data

Jun. 6, 1989 [DE] Fed. Rep. of Germany ....... 3918368

[51] Int. Cl.$^5$ .................... C08G 69/26; C07D 11/06
[52] U.S. Cl. .................... 528/339.3; 528/87; 524/607; 260/DIG. 38
[58] Field of Search .................... 528/87, 339.3; 260/DIG. 38; 524/607

[56] References Cited

U.S. PATENT DOCUMENTS

| Re. 28,533 | 8/1975 | Drawert et al. | 528/339.3 |
|---|---|---|---|
| 2,482,761 | 9/1949 | Goebel | 560/167 |
| 3,256,304 | 6/1966 | Fischer et al. | 528/339.3 |
| 4,045,389 | 8/1977 | Drawert et al. | 528/339.3 |
| 4,066,585 | 1/1978 | Schepp et al. | 528/339.3 |
| 4,072,641 | 2/1978 | Loeb | 528/339.3 |
| 4,206,097 | 6/1980 | Drawert et al. | 525/420.5 |
| 4,385,166 | 5/1983 | Carlick et al. | 528/111.3 |
| 4,396,759 | 8/1983 | Drawert et al. | 528/339.3 |
| 4,698,396 | 10/1987 | Drawert et al. | 525/420.5 |
| 4,786,666 | 11/1988 | Cecil et al. | 528/111.3 |
| 4,889,560 | 12/1989 | Jaeger et al. | 528/339.3 |
| 4,912,196 | 3/1990 | Leoni et al. | 528/339.3 |
| 4,966,945 | 10/1990 | Drawert et al. | 525/420.5 |

Primary Examiner—John Kight, III
Assistant Examiner—P. Hampton-Hightower
Attorney, Agent, or Firm—Curtis, Morris & Safford

[57] ABSTRACT

The invention relates to polyamide resins and to their use as vehicles in the manufacture of printing inks. These poly-amide resins can be obtained by condensation of dimeric fatty acids, monomeric fatty acids, ethylenediamine, and adducts containing amino groups and prepared from aromatic or cycloaliphatic glycidyl ethers and amines containing primary amino groups.

1 Claim, No Drawings

POLYAMIDE RESINS BASED ON DIMERIZED FATTY ACIDS, PROCESS FOR PRODUCING THEM, AND PROCESS FOR MANUFACTURING PRINTING INKS BY THE USE OF SAID POLYAMIDE RESINS

This invention relates to polyamide resins which can be obtained by reacting dimerized fatty acids, monomeric fatty acids, ethylenediamine, and adducts containing free amino groups, prepared from glycidyl ethers and at least one amino component; a process for producing said polyamide resins; a process for manufacturing printing inks by the use of said polyamide resins; and the use of said printing inks for printing substrates by the rotogravure or flexographic printing methods.

The requirements to be met by the printing-ink industry in the manufacture of printing inks for the printing of food- packaging materials include, in addition to the necessary resistance of the ink film to water and chemicals as well as good solubility of the ink vehicle at room temperature, increasingly also improved gelation resistance at temperatures of about 0° C. and below as well as rapid thawing ability at room temperature, coupled with as high a blocking point as possible.

Polyamide inks for rotogravure and flexographic printing which are used primarily for the printing of food-packaging materials are already known.

These polyamide resins, produced by condensation from dimeric fatty acids and diamines, occasionally with the use of chain terminators, have good flexibility, good adhesion to the usual substrates, and high gloss.

However, they do have the drawback that their solutions gel, completely or partially, just below room temperature.

During transportation or storage in the cold, the solutions thus gel and have to be thawed before the printing operation. Storage in fairly large tanks thus is feasible only in heated warehouses. Storage Outdoors requires that timely precautionary measures be adopted.

Attempts to reduce the gelation temperature have led to products with poorer resistance to water and chemicals and a lower blocking point.

In the food sector, good resistance to water, dilute acids, bases and chemicals is required wherever the printed goods are exposed to increased concentrations of these media during storage or use, as in deep freezing, packaging, and transportation.

A sufficiently high blocking point is necessary in order to obtain as quickly as possible after printing a physically dry surface on the substrate since otherwise there may be setoff as the plastic film is being rolled up, that is, a transfer of printing ink to the unprinted underside of the film. Moreover, if the blocking point is too low, the stacked packaging materials will stick together when stored at a slightly higher temperature.

A printing ink has good gelation resistance when it exhibits satisfactory rheological properties even at low temperatures and is homogeneously liquid, that is, it comprises no gel particles, much less has it completely gelled.

While the gelation behavior and the ability to thaw are also influenced by the type and quantity of the solvent or solvent mixture and the concentration of the solution, they are determined mainly by the resin itself.

The practical requirements of high blocking points and good resistance to chemicals have militated against efforts to achieve gelation resistance also at lower temperatures. The measures which are required to improve one of these properties have been known to those skilled in the art. So has the fact that these measures have an adverse effect on the other properties concerned. This had led to compromises which can no longer satisfy ever tougher practical requirements.

The invention has as one object to overcome these drawbacks and to develop polyamide resins suitable for the formulation of printing inks which have an improved gelation behavior and ability to thaw while the ink films produced with them have high blocking points.

This object is accomplished through polyamide resins from dimeric fatty acids, monomeric fatty acids having from 16 to 21 carbon atoms, and preferably 18 carbon atoms, ethylenediamine, and adducts containing free amino groups and prepared from at least one aliphatic, cycloaliphatic, alicyclic or araliphatic diamine with two primary amino groups, optionally substituted, and optionally containing ether groups, and at least one cycloaliphatic and/or alicyclic and/or araliphatic glycidyl ethers.

The invention thus relates to polyamide resins which are obtainable by reacting
(1) from 0.5 to 0.8 equivalent of dimerized fatty acids;
(2) from 0.2 to 0.5 equivalent of at least one fatty acid having from 16 to 21 carbon atoms;
(3) from 0.6 to 0.9 equivalent of ethylenediamine; and
(4) 0.1 to 0.4 equivalent of at least one adduct containing free amino groups and prepared from at least one aliphatic, cycloaliphatic, alicyclic or araliphatic diamine with two primary amino groups, optionally substituted, and optionally containing ether groups, and at least one cycloaliphatic and/or alicyclic and/or araliphatic glycidyl ether, the acids according to (1) and (2) and the amine components according to (3) and (4) being used in practically equivalent amounts.

The invention further relates to a process for producing these polyamide resins which is characterized in that all components are charged together at room temperature and heated with vigorous stirring to temperatures of from 160° to 280° C., and preferably from 180° to 230° C., the condensate formed being continuously removed, and the reaction being completed at pressures of less than 1,013 millibars, and preferably less than 100 millibars, if indicated.

The invention relates, moreover, to a process for manufacturing printing inks from vehicles based on polyamide resins, solvents, dyes, pigments and optionally commonly used additives, the process being characterized in that polyamide resins are used as vehicles which are obtained by reacting
(1) from 0.5 to 0.8 equivalent of dimerized fatty acids,
(2) from 0.2 to 0.5 equivalent of at least one fatty acid having from 16 to 21 carbon atoms,
(3) from 0.6 to 0.9 equivalent of ethylenediamine, and
(4) from 0.1 to 0.4 equivalent of an adduct of at least one glycidyl ether with at least one diamine, the acids according to (1) and (2) and the amine components according to (3) and (4) being used in practically equivalent amounts.

The invention further relates to the use of the printing inks for printing organic and/or inorganic substrates by the rotogravure or flexographic printing methods.

The inventive polyamide resins are preferably used as vehicles in the manufacture of printing inks for rotogravure and flexography and impart to the resin solutions prepared from them not only the required resistance to the media usually encountered in the food sector but, surprisingly, also excellent gelation resistance even at temperatures below 0° C. and rapid thawing ability at room temperature, and the ink films produced from them have blocking points which are as high as and occasionally even higher than those obtained With the known resins.

The dimeric fatty acids used in producing the polyamide resins of the invention are commercial products obtained by polymerization by known methods of saturated or unsaturated monobasic aliphatic fatty acids having from 16 to 22 carbon atoms. (See, for example, U.S. Pat. Nos. 2,482,761 and 3,256,304.) Typical dimeric fatty acids which are available commercially have approximately the following composition:

| | |
|---|---|
| Monomeric acids | 0 to 15 weight percent |
| Dimeric acids | 60 to 95 weight percent |
| Trimerized and higher-polymerized acids | 1 to 35 weight percent |

Depending on the source of the monomers, the polymerization method and the processing method, the exact composition may vary within these limits.

The dimeric fatty acids which are preferred in accordance with the invention contain from 0 to 10 percent by weight of monomeric fatty acid, from 65 to 75 percent by weight of dimeric fatty acid, and from 15 to 25 percent by weight of trimerized and higher polymerized fatty acids, as determined by gas-liquid chromatography.

For modification, at least one monomeric fatty acid is used. For the purposes of the invention, monomeric fatty acids are monobasic aliphatic carboxylic acids having from 16 to 22 carbon atoms, which may be substituted, if desired, and contain multiple bonds, and particularly one or more double bonds.

In accordance with the invention, naturally occurring fatty-acid mixtures containing mainly $C_{18}$ and minor amounts of $C_{16}$ acids are preferred.

The ratio of dicarboxylic acids to monocarboxylic acids should be between 0.5 to 0.8 and 0.2 to 0.5 equivalent, based on total carboxyl groups.

The amines which in accordance with the invention are used to form adducts, and which may be used alone or in a mixture, are aliphatic, cycloaliphatic, alicyclic or araliphatic compounds with two primary amino groups, which optionally are substituted and optionally contain ether groups, and which carry reactive amino hydrogen atoms. Reactive amino hydrogen atoms means that the amino groups are capable of forming adducts with the glycidyl ethers which in accordance with the invention are also used.

Suitable amines are, in particular, ethylenediamine, hexamethylenediamine, 1,2-propanediamine, 2-methyl-1,5-penta-methylenediamine, 2,2,4 (2,44)-trimethylhexamethylenediamine, isophoronediamine, diaminocyclohexane, xylylenediamine, and 1,12-diamino-4,9-dioxadodecane.

The ratio of the amines to the total amounts of acid, based on reactive amino and carboxyl groups, is approximately 1:1, that is, they are practically equivalent.

While the amines or acids may be used in a slight excess, which will result in changes in the properties with which those skilled in the art are familiar, it is not recommended in accordance with the invention.

The glycidyl ethers which in accordance with the invention are used in the formation of adducts are the known liquid compounds based on optionally substituted polyhydric phenols and cycloaliphatic or alicyclic alcohols. These compounds are described in the Handbook of Epoxy Resins, by Lee and Neville, 1967, McGraw-Hill, N.Y., and may be represented by the general formula:

$$CH_2\underset{O}{\overset{}{\diagdown\diagup}}CH-CH_2\!-\!\!\!+\!\!O-R-O-CH_2-\underset{OH}{\overset{}{CH}}-CH_2\!+\!\!O-R-O-CH_2-CH\underset{O}{\overset{}{\diagdown\diagup}}CH_2$$

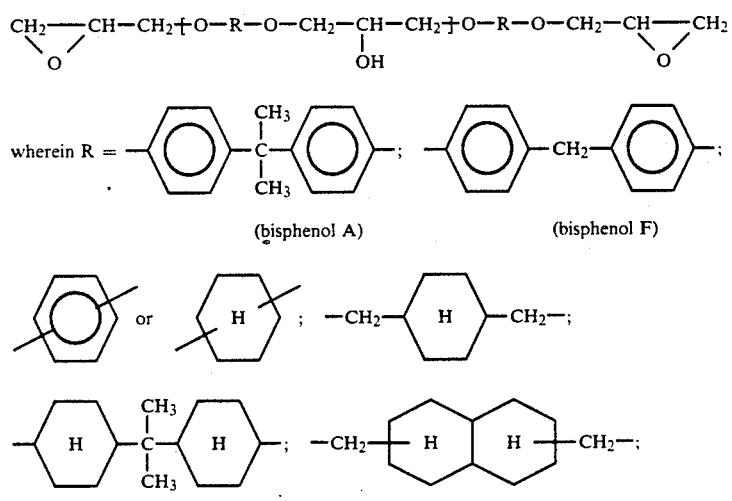

and n is a number between 0 and 2, and preferably between 0 and 1, and more particularly between 0 and 0.5.

Depending on the structure of R, the upper value of n is selected so that the glycidyl ethers are liquid and the finished polyamide resins are still soluble in the solvents concerned to give clear solutions. If cloudiness is not a factor in the further use of the polyamide resin, n is chosen so the glycidyl ethers are still liquid and soluble in the desired solvents. The exact values of n within the range from 0 to 2 can readily be determined by trial and error.

The liquid glycidyl ethers based on bisphenol A, 2,2-bis-(4-hydroxyphenol)propane, and bisphenol F, bis(4-hydroxyphenol)-methane, with n=0 to 0.5, corresponding to epoxy values of from 0.41 to 0.56, and the liquid glycidyl ethers based on 1,4-dihydroxymethylcyclohexane, are preferred in accordance with the invention. The adducts are preferably prepared by introducing as initial charge 10 mols of amine and then adding the glycidyl ether dropwise. On completion of the reaction, which proceeds at room temperature or at temperatures of up to about 80° C., the excess amine is distilled off under vacuum.

The isolated adducts so obtained may be used alone or in mixtures. Mixed adducts, which can also be used, can be prepared by using amine mixtures for the formation of adducts. Basically, however, there is no difference between adduct mixtures and mixed adducts. The amount of adducts to be used depends on the desired softening point, which should be above 90° C. As a rule, from 0.1 to 0.4, and more particularly from 0.2 to 0.3, equivalent, based on total amine equivalents, will be sufficient.

The polyamide resins of the invention can be produced by introducing the acids, the ethylenediamine and the isolated adduct in practically equivalent amounts as initial charge at room temperature under an atmosphere of nitrogen into a three-necked flask equipped with an agitator, a thermometer, a water take-off line and a reflux condenser. Then the reaction is carried out under the conditions known for the production of polyamide resins. The procedure which in accordance with the invention is preferred is to heat the charge over a period of 1 to 2 hours to the reaction temperature, continue the reaction for 1 to 2 hours at that temperature while removing the condensate continuously, and completing it by applying a vacuum at the same temperature.

The reaction temperatures range from 160° to 280° C., and preferably from 180° to 230° C. The pressure in the final phase should be less than 1,013 millibars, and preferably less than 100 millibars, the range from about 10 to 30 millibars being particularly preferred in accordance with the invention.

While the reaction conditions will usually be as indicated above, the procedure of bringing the reaction components together may be varied without the gelation resistance of the printing ink or the physical properties of the ink film being measurably affected.

As a modification of the above procedure, all components may therefore be introduced at the same time as initial charge or subjected separately to a preliminary reaction, which is then followed by a secondary reaction with the other component or components.

In a procedure which is preferred in accordance with the invention, an adduct is prepared from the glycidyl ether and an excess of at least one of the amine components. This epoxy-amine adduct, which comprises free amino groups, can be isolated from the amine excess by appropriate measures and subjected with ethylene-diamine and optionally a further amine component to a condensation reaction.

The polyamide resins of the invention are flexible resins with ring-and-ball softening points (determined in conformity with DIN 52011) between 90° and 110° C., and preferably between 100° and 105° C.

They are soluble in solvent mixtures of short-chain alcohols, such as ethanol, n-propanol or isopropanol, and aliphatic hydrocarbons having a boiling range of from 60° to 140° C., such as the gasoline fractions with boiling ranges of from 80° to 110° C. and from 100° to 140° C., and/or aromatic hydrocarbons, particularly toluene.

Using these solvents, and using in addition pigments, dyes, waxes, extenders, wetting agents and flow-control agents, printing inks can be manufactured by the known method which are gelation-resistant at low temperatures and whose films, printed on appropriate substrates, have blocking points of up to 90° C. after the solvent has evaporated.

A further advantage of the resins of the invention is the rapid thawing ability of printing inks manufactured from them which have gelled at very low temperatures. This rapid thawing ability is coupled with a low energy input by comparison with the commercial printing inks based on polyamide resins.

Substrates which are suitable for being printed with printing inks manufactured in accordance with the invention are the known materials for packaging, also in the food sector, and advertising, such as plastic film and sheeting made of polyethylene, polypropylene or polyester, paper, paperboard, metal foil, metal-coated paper and film.

Preparation of isolated adducts

To a one-liter three-necked flask purged with nitrogen and equipped with an agitator, a thermometer and a reflux condenser, 4 mols of an amine are charged under a N₂ atmosphere and heated to 60° C. To this amine there is added dropwise over a period of 90 minutes 0.4 mol of a glycidyl ether based on bisphenol A with an epoxy value of 0.54. The reaction mixture is then allowed to react for another 120 minutes at 60° C., and the excess amine is then distilled off under vacuum.

By this procedure, adducts were prepared with the following amines:

| Adduct | Glycidyl ether | Amine | Amine value (mg KOH/g) |
|---|---|---|---|
| A | a | Ethylenediamine | 460 |
| B | a | 1,2-Diaminopropane | 401 |
| C | c | Isophoronediamine | 375 |
| D | a | 2-Methyl-1,5-pentamethyl-enediamine | 331 |
| E | a | Hexamethylenediamine | 383 |
| F | d | Ethylenediamine | 639 |
| G | a | 2,2,4(2,44)-Trimethyl-hexamethylenediamine | 325 |
| H | a | 1,2-Diaminocyclohexane | 292 |
| I | a | Xylylenediamine | 340 |
| K | a | 1,12-Diamino-4,9-dioxadodecane | 280 |
| L | b | Ethylenediamine | 370 | a = Glycidyl ether based on bisphenol A, epoxy value 0.54
b = Glycidyl ether based on bisphenol A, epoxy value 0.41
c = Glycidyl-ether mixture based on bisphenol A and bisphenol F in a ratio of 80:20, epoxy value 0.53
d = Glycidyl ether based on 1,4-dihydroxymethylcyclohexane, epoxy value 0.78

Production of resins

The acid components are charged to a one-liter three-necked flask purged with nitrogen and equipped with an agitator, a thermometer and a distillation head, which is evacuated twice and then aerated with nitrogen, following which ethylenediamine and the adduct are added. Over a period of 2 hours the temperature is raised to 230° C. Condensation is continued at that temperature for 4 hours, a pressure of 15 to 20 millibars being applied for the last two hours.

The dimeric fatty acids used had the following composition:

|  | I | II |
|---|---|---|
| Monomeric fatty acid | 0.57% | 2.47% |

-continued

|  | I | II |
|---|---|---|
| Dimeric fatty acid | 82.57% | 93.31% |
| Trimerized and higher-polymerized fatty acids | 16.87% | 4.23% |

The monomeric fatty acid used ia a commercial tall-oil fatty acid.

ink is transferred back into the Erlenmeyer flask used before and diluted with ethanol/benzene (80/110=1:1) to printing viscosity. (Time of efflux, 20 to 22 seconds, DIN 4 cup.)

The finished printing inks so obtained are then used in printing with a commercial laboratory printing press from roll to roll on both polyethylene and uncoated cellophane film. After a storage period of 2 days at room temperature, the ink films are subjected to the tests described below.

TABLE 1

|  | EQUIVALENTS | | | | ANALYTICAL DATA | | | |
|---|---|---|---|---|---|---|---|---|
|  | Dimeric fatty acid | Monomeric fatty acid | Ethylene-diamine | Adduct | Amine value mg KOH/g | Acid value mg KOH/g | Softening point, °C. DIN 52001 | Viscosity[1] 165° C. Pa · s |
| Example |  |  |  |  |  |  |  |  |
| 1 | I 0.80 | 0.20 | 0.8 | B 0.2 | 15.3 | 6.1 | 98 | 1.65 |
| 2 | I 0.74 | 0.26 | 0.8 | C 0.2 | 7.9 | 6.1 | 97 | 1.37 |
| 3 | I 0.65 | 0.35 | 0.8 | D 0.2 | 10.5 | 3.1 | 100 | 0.90 |
| 4 | I 0.65 | 0.35 | 0.8 | E 0.2 | 5.9 | 2.7 | 100 | 1.04 |
| 5 | I 0.70 | 0.30 | 1.0 | a[2] | 12.5 | 2.8 | 102 | 0.91 |
| 6 | I 0.73 | 0.27 | 0.8 | F 0.2 | 5.8 | 5.5 | 100 | 0.90 |
| 7 | I 0.68 | 0.32 | 0.8 | G 0.2 | 7.0 | 2.0 | 101 | 1.50 |
| 8 | I 0.69 | 0.31 | 0.8 | A 0.2 | 9.2 | 2.6 | 101 | 1.11 |
| 9 | II 0.60 | 0.40 | 0.7 | A 0.3 | 11.3 | 2.9 | 98 | 0.74 |
| 10 | I 0.52 | 0.48 | 0.6 | A 0.4 | 14.0 | 4.0 | 92 | 0.51 |
| 11 | I 0.79 | 0.21 | 0.8 | L 0.2 | 9.5 | 4.0 | 101 | 2.89 |
| 12 | I 0.82 | 0.18 | 0.9 | A 0.1 | 9.2 | 3.9 | 102 | 2.14 |
| 13 | I 0.75 | 0.25 | 0.8 | H 0.2 | 14.4 | 4.4 | 99 | 1.22 |
| 14 | I 0.65 | 0.35 | 0.8 | I 0.2 | 9.0 | 4.1 | 99 | 1.27· |
| 15 | I 0.68 | 0.32 | 0.8 | K 0.2 | 9.6 | 4.2 | 102 | 1.7 |
| Comparative examples |  |  |  |  |  |  |  |  |
| 16 | 0.73 | 0.27 | 1.0 | — | 7.0 | 6.5 | 110 | 2.10 |
| 17 | 0.80 | 0.20 | 0.85 IPD[3] 0.15 |  | | | | |

[1]Viscosity measured with a cone-plate viscometer made by Haake. Measurement made as directed by maker.
[2]No adduct. Glycidyl ether a charged together with the other components.
[3]Isophoronediamine.

All of the polyamide resins of the invention listed in Table 1 were then treated and tested as described below.

TESTING OF RESIN VARNISHES

1. Gelation resistance

Solutions containing 30% of resin in ethanol/benzene (80/110=1:1) are cooled in 5° C. steps, beginning at 20° C., after being stored for 24 hours.

Evaluation criteria are (a) the temperature at which the solutions gel, and (b) whether they thaw on again reaching room temperature. (See Table 2).

2. Freeze/thaw behavior 50-gram solutions containing 30% of resin in ethanol/benzene (80/110=1:1) are stored in a 100 Erlenmeyer flask for about 16 hours at −28° C. in a refrigerator.

At the end of this storage period, the flasks containing the solutions which have meanwhile gelled are taken out of the refrigerator and the thawing behavior at room temperature is observed. Recorded are:

(a) The time elapsing until the solutions begin to thaw at the rim of the flasks, and (b) the time elapsing until the gelled solutions have completely thawed. (See Table 3.)

Manufacture of printing inks and ink films 30 g of polyamide resin are dissolved in 70 g of ethanol/benzene (80/110=1:1) with stirring in a 500 Erlenmeyer flask. The solution is fed into the grinding chamber of a ball mill and 10 g of an organic red pigment is added. After a dispersing time of 20 minutes, the

TESTING OF INK FILMS

3. Blocking point

Portions of the stored uncoated cellophane film bearing ink films are folded against each other and placed between plane-surfaced glass sheets. These are then stored under a load of 60 g/m² in a drying oven at temperatures raised daily in 10° C. increments.

The criterion for evaluation is the temperature at which the films first exhibit very slight damage after unfolding. (See Table 4.)

TABLE 2

| No. | No. Table 1 | Gelation temperature, °C. | Thaws at room temperature? |
|---|---|---|---|
| 1 | 1 | −5 | Yes |
| 2 | 2 | −5 | Yes |
| 3 | 3 | −5 | Yes |
| 4 | 4 | −5 | Yes |
| 5 | 5 | −5 | Yes |
| 6 | 6 | −5 | Yes |
| 7 | 7 | −5 | Yes |
| 8 | 8 | −5 | Yes |
| 9 | 9 | −10 | Yes |
| 10 | 10 | −10 | Yes |
| 11 | 11 | −5 | Yes |
| 12 | 12 | 10 | Yes |
| 13 | 13 | −5 | Yes |
| 14 | 15 | −5 | Yes |
| 15 | 15 | −5 | Yes |
| A | A | 0–5· | Yes |
| B | B | 5–10 | Yes |

TABLE 3

| No. | No. Table 1 | Onset of thawing (minutes) | Completely thawed (minutes) |
|---|---|---|---|
| 1 | 1 | 15 | 27 |
| 2 | 2 | 15 | 27 |
| 3 | 3 | 17 | 29 |
| 4 | 4 | 17 | 30 |
| 5 | 5 | 17 | 30 |
| 6 | 6 | 19 | 33 |
| 7 | 7 | 18 | 34 |
| 8 | 8 | 15 | 30 |
| 9 | 9 | 14 | 27 |
| 10 | 10 | 12 | 25 |
| 11 | 11 | 12 | 26 |
| 12 | 12 | 16 | 30 |
| 13 | 13 | 15 | 28 |
| 14 | 14 | 16 | 29 |
| 15 | 15 | 17 | 30 |
| A | A | 25 | 40 |
| B | B | 35 | 55 |

TABLE 4

| No. | No. Table 1 | Blocking point °C. |
|---|---|---|
| 1 | 1 | 90 |
| 2 | 2 | 80 |
| 3 | 3 | 80 |
| 4 | 4 | 80 |
| 5 | 5 | 80 |
| 6 | 6 | 90 |
| 7 | 7 | 90 |
| 8 | 8 | 90 |
| 9 | 9 | 70–80 |
| 10 | 10 | 70 |
| 11 | 11 | 90 |
| 12 | 12 | 80–90 |
| 13 | 13 | 80 |
| 14 | 14 | 90 |
| 15 | 15 | 80 |
| A | A | 80 |
| B | B | 90 |

We claim:

1. A printing ink comprising a polyamide resin having been prepared by a process comprising reacting
   (1) from 0.5 to 0.8 equivalent of dimerized fatty acid;
   (2) from 0.2 to 0.5 equivalent of at least one fatty acid having from 16 to 21 carbon atoms;
   (3) from 0.6 to 0.9 equivalent of ethylenediamine; and
   (4) 0.1 to 0.4 equivalent of at least one adduct containing a free amino group and prepared from at least one aliphatic, cycloaliphatic, alicyclic or araliphatic diamine with two primary amino groups, optionally substituted, and optionally containing an ether group, and at least one compound selected from the group consisting of a cycloaliphatic alicyclic and araliphatic glycidyl ether wherein all the reactants are in a solvent and suitable adjuvants.

* * * * *